United States Patent [19]
Zamudio-Castillo et al.

[11] Patent Number: 5,421,038
[45] Date of Patent: Jun. 6, 1995

[54] REFILLING PREVENTING SYSTEM FOR A TOILET TANK

[75] Inventors: Mario-Rodolfo Zamudio-Castillo; Francisco Vazquez-Acosta; Francisco-Javier Melendez-Rodriguez, all of Nuevo León, Mexico

[73] Assignee: Sanitarios Azteca, S.A., Nuevo Leon, Mexico

[21] Appl. No.: 263,076

[22] Filed: Jun. 21, 1994

[51] Int. Cl.6 .................. E03D 1/36; F16K 31/18
[52] U.S. Cl. ................................. 4/367; 4/368; 4/415; 137/400; 137/428
[58] Field of Search .................. 4/366-368, 4/372-377, 415; 137/400, 410, 428

[56] References Cited

U.S. PATENT DOCUMENTS

| | | | |
|---|---|---|---|
| 2,604,112 | 7/1952 | Thorsheim | 137/428 X |
| 3,335,747 | 8/1967 | Schipper | 137/428 X |
| 3,553,740 | 1/1971 | Fogg | 137/428 |
| 3,574,867 | 4/1971 | Biniores | 137/400 X |
| 4,471,798 | 9/1984 | Johannesen | 4/366 X |

Primary Examiner—Robert M. Fetsuga
Attorney, Agent, or Firm—Abelman, Frayne & Schwab

[57] ABSTRACT

A refilling preventing system for a toilet tank, to prevent refilling of the tank in case of a leak, comprising: a receptacle in the tank in which the buoyant float of the fill valve is placed; a water filling conduit to fill the receptacle after a flush discharge; a plug closing the overflow tube, to cause a momentary vacuum at a flush conduit of the toilet bowl connected to the discharge opening of the toilet tank after a flush discharge and when the stopper is at a closing position; and a siphon conduit, operable by a lever mechanism, which is connected to the discharge opening and to said receptacle, that allows to flush the receptacle, after a flush discharge, by a siphon effect created by the vacuum at the flush conduit of the bowl. In case of a leak emptying the tank, the receptacle will remain filled and the buoyant float will be at its closing position impeding the fill valve to refill of the tank.

6 Claims, 2 Drawing Sheets

[5,421,038]

REFILLING PREVENTING SYSTEM FOR A TOILET TANK

BACKGROUND OF THE INVENTION

1. Field of the Invention

The present invention refers to a refilling preventing system for a toilet tank, and more specifically to a refilling preventing system for a toilet tank to prevent refilling of the tank in case of a leak.

2. Description of the Previous Art

Toilet tanks normally include a filling valve connected to a water intake and securely coupled at the bottom of the tank, said filling valve is operable by the action of a buoyant float coupled therewith, to open the filling valve when it is at a bottom opening position and to close the filling valve when it is at an upper closing position; a flush tube coupled to an overflow opening at the bottom of the tank, to discharge the water to the toilet bowl in case that the tank is filled beyond the desired level; a conduit connected to the filling valve and to the flush tube, to fill the toilet bowl at a desired level creating a water seal at the bowl through said overflow tube; and a flush valve including a flush stopper pivotally mounted on a lower end of the overflow tube at a point pin and coupled to a discharge opening at the bottom of the tank, which is manually operable by a flush lever mechanism connected to said stopper by a cord or the like; said flush tube and said discharge opening being connected to a flush conduit at the bowl, to discharge the water of the tank to the bowl.

The areas wherein said filling valve, overflow tube and flush valve, are placed within the toilet tank, normally represent points of possible leak mainly because of wearing of parts such as the seat of the stopper, the stopper and imperfections caused to the seat of the flushing aperture of the toilet tank, consequently spoiling a great amount of water which usually remains undetected.

Saving water, is one of the greatest challenges in the water closet manufacturing industry.

A relevant effort to avoid spoiling of water in case of leaks through the components of a toilet tank, is disclosed in the US. Pat. No. 4,843,657 of Orr, for an anti-flood toilet tank valve wherein a catch mechanism is adapted to engage the float of an specific filling valve, to prevent it from causing the; tank to refill, unless the flush lever has been operated.

However, said anti-flood valve is limited and only useful when using filling valves of the type including a post or tube around which the buoyant float is mounted to slide up closing the valve and down to refill the tank, because the catch mechanism is designed specifically to prevent the buoyant float to fall down when the flush lever had not been operated, so that in case of a leak, the tank will be emptied but the filling valve is prevented to fill the tank again because the buoyant float remains in an upper position by said latch mechanism.

Furthermore, said anti-flood valve is ineffective when the tank is not filled in cases wherein The leak flow is greater than the filling flow, caused for example when the stopper is coupled out of line regarding the seat of the discharge opening of the tank.

Therefor, it was a main objective to provide a reliable refilling preventing system for a toilet tank, to prevent refilling of the tank in case of a leak, which is effective for any type of filling valves operable by a remote buoyant float, and in cases wherein the filling flow is less or greater than the leaking flow.

The refiilillg preventing system for a toilet tank, to prevent refilling of the tank in case of a leak, in accordance with the present invention, comprising, in combination: a receptacle in the tank in which the buoyant float of the fill valve is placed; a water filling conduit to fill the receptacle after a flush discharge; plug means closing the overflow tube, to cause a vacuum at the flush conduit of the toilet bowl connected to the discharge opening of the toilet tank, after a flush discharge and when the stopper is at a closing position; and a siphon conduit, operable by a lever mechanism, which is connected to the discharge opening and to said receptacle, that allows to flush the receptacle, after a flush discharge, by a siphon effect created by the vacuum at the throat, providing the water seal at the bowl.

This refilling preventing system will prevent refilling of the tank in case of a leak, either at a flow less or greater than the filling flow, emptying the tank, because the receptacle will remain filled and the buoyant float will be at its closing position impeding the fill valve to refill of the tank.

SUMMARY OF THE INVENTION

It is therefore a main object of the present invention, to provide a reliable refilling preventing system for a toilet tank, to prevent refilling of the tank in case of a leak in the tank.

It is also a main object of the present invention, to provide a refilling preventing system for a toilet tank, of the above disclosed nature, which allows to save water by impeding that the toilet tank be filled when it has been emptied because of a leak either at a flow less or greater than the filling flow through the components of said toilet tank.

It is still another main object of the present invention, to provide a refilling preventing system for a toilet tank, of the above disclosed nature, which includes a receptacle in the tank, in which the buoyant float of the fill valve is placed, which will prevent refilling of the tank in case of a leak emptying the tank, because the receptacle will remain filled and the buoyant float will be at its closing position impeding the filling valve to refill of the tank These and other objects and advantages of the present invention will be apparent from the following description of an specific preferred embodiment thereof.

DESCRIPTION OF THE SPECIFIC EMBODIMENTS OF THE INVENTION

Figure 1:
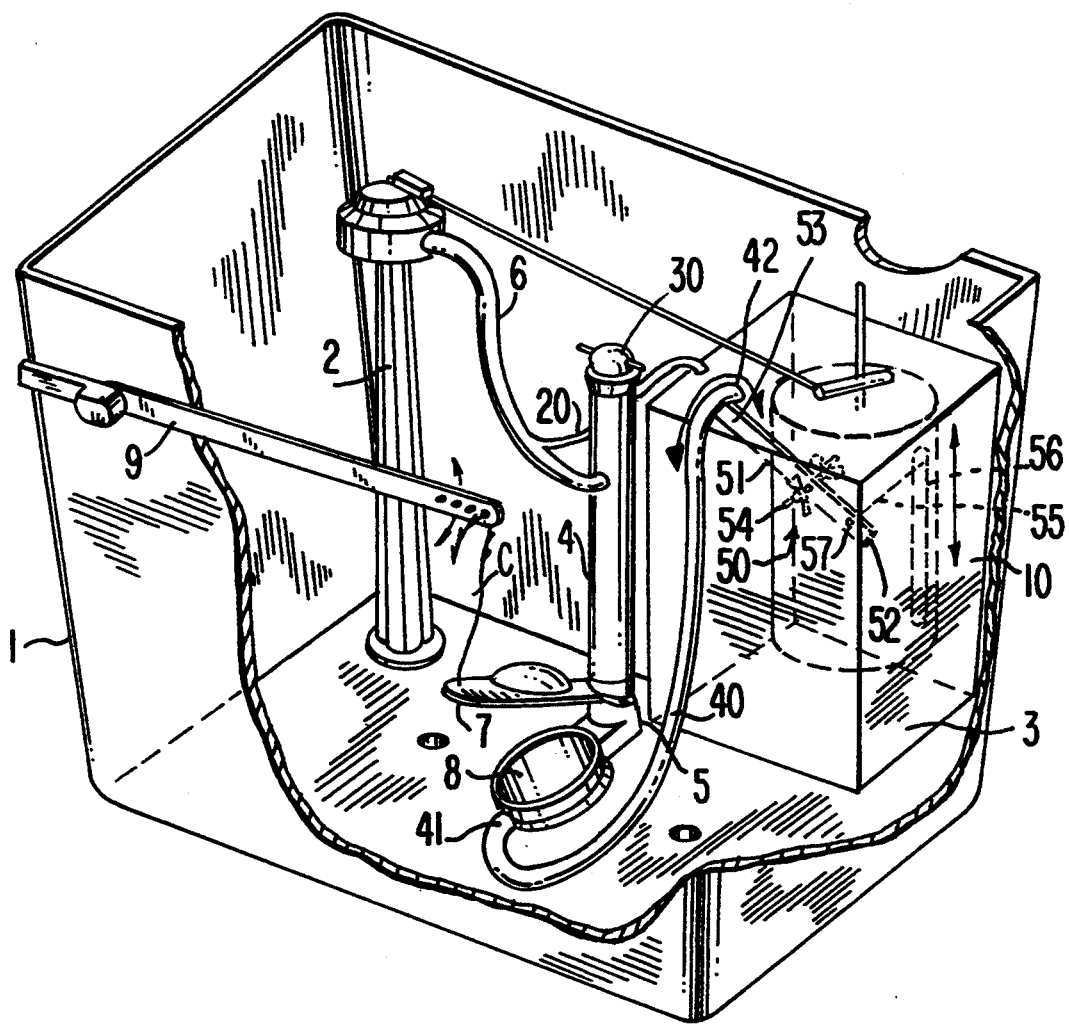
FIG. 1 is a cross section view of a toilet tank including the refilling preventing system in accordance with a first embodiment of the present invention.

A typical water closet comprising a toilet bowl (not illustrated) and a toilet tank 1 comprising: a filling valve 2 connected to a water line (not illustrated), which is securely coupled to the bottom of the tank 1, and which is operable by a buoyant float 3 connected therewith, to open the filling valve 2 when it is at a bottom opening position after a flush discharge and close said filling valve 2 when it is at an upper closing position and the tank 1 is at a desired level of water; an overflow tube 4 coupled to an overflow opening 5 at the bottom of the tank 1, to discharge the water to the toilet bowl in case the tank 1 is filled beyond the desired level; a flexible conduit 6 connected to the filling valve 2 and to the overflow tube 4, to fill the bowl at a desired level creating a water seal at the bowl after a flush discharge; and a flush stopper 7 pivotally mounted on a lower end of the overflow tube 4 at a point pin and coupled to a discharge opening 8 at the bottom of the tank 1 and operated by a flush lever 9 connected to said stopper 7 by a cord C or the like; said flush tube and said discharge opening being connected to a flush conduit at the bowl, to discharge the water of the tank to the bowl.

The refilling preventing system for a toilet tank, to prevent refilling of the tank in case of a leak through the stopper or other parts of the tank, in accordance with the present invention, comprising a receptacle 10 at a corner of the tank 1, in which the buoyant float 3 of the filling valve 2 is placed, to fill the tank 1 in accordance to the desired level of water in the receptacle 10; a by-pass conduit 20 connected to the flexible conduit 6 and to said receptacle 10, to fill the receptacle 10 after a flush discharge, while the filling valve 2 is filling the tank 1; a floating plug 30 closing the top of the overflow tube 4, to create a vacuum at a flush conduit of the toilet bowl (not illustrated) connected to the discharge opening of the toilet tank 1 after a flush discharge and when the stopper 7 is at a closing position; a siphon conduit 40 having a lower end 41 connected to the discharge opening 8 and a top end 42, connected to the top of said receptacle 10; and a lever mechanism 50 including a lever 51 secured to a wall of the receptacle 10 by a horizontal pivot member 54 in an intermediate portion thereof, a horizontal rod 55 having a first end 56 connected to the buoyant float 3 and a second end 57 connected to a first end 52 of the lever 51, a second end 53 of said lever 51 being connected to the top end 42 of the siphon conduit 40, so that after the flush lever 9 is operated lifting the stopper 7 to provide a flush of water and the stopper 7 falls again closing the discharge opening 8 of the tank, this causes, by the effect of the plug 30 a vacuum at the flush conduit of the toilet bowl and the discharge opening 8 of the toilet tank 1, creating a siphon effect through said siphon conduit 40 discharging the water of the receptacle 10 filling the bowl at a desired level to create a water seal at the bowl after a flush discharge and allowing the buoyant float 3 to fall down opening the filling valve 2 and, when the buoyant float 3 reaches to a desired level in the receptacle 10, the lever 51 lifts the siphon conduit 40 interrupting the siphon effect allowing the water to fill the tank 1 through the filling valve 2 and the receptacle 10 through the by-pass conduit 20 which can be finally filled by overflow over the top wall of said receptacle 10.

The floating plug 30 closing the top end of the overflow tube 4, has the effect to provide a vacuum through said siphon conduit 40 and discharge opening 8 when the stopper 7 is closing said discharge opening 8. In the case that the level of water in toilet tank 1 overflows beyond the height of the overflow tube 4 because of any failure in the filling valve 2, the plug 30 floats on the water opening the top of the overflow tube 4 so that the overflow water can be discharged through it.

Figure 2:
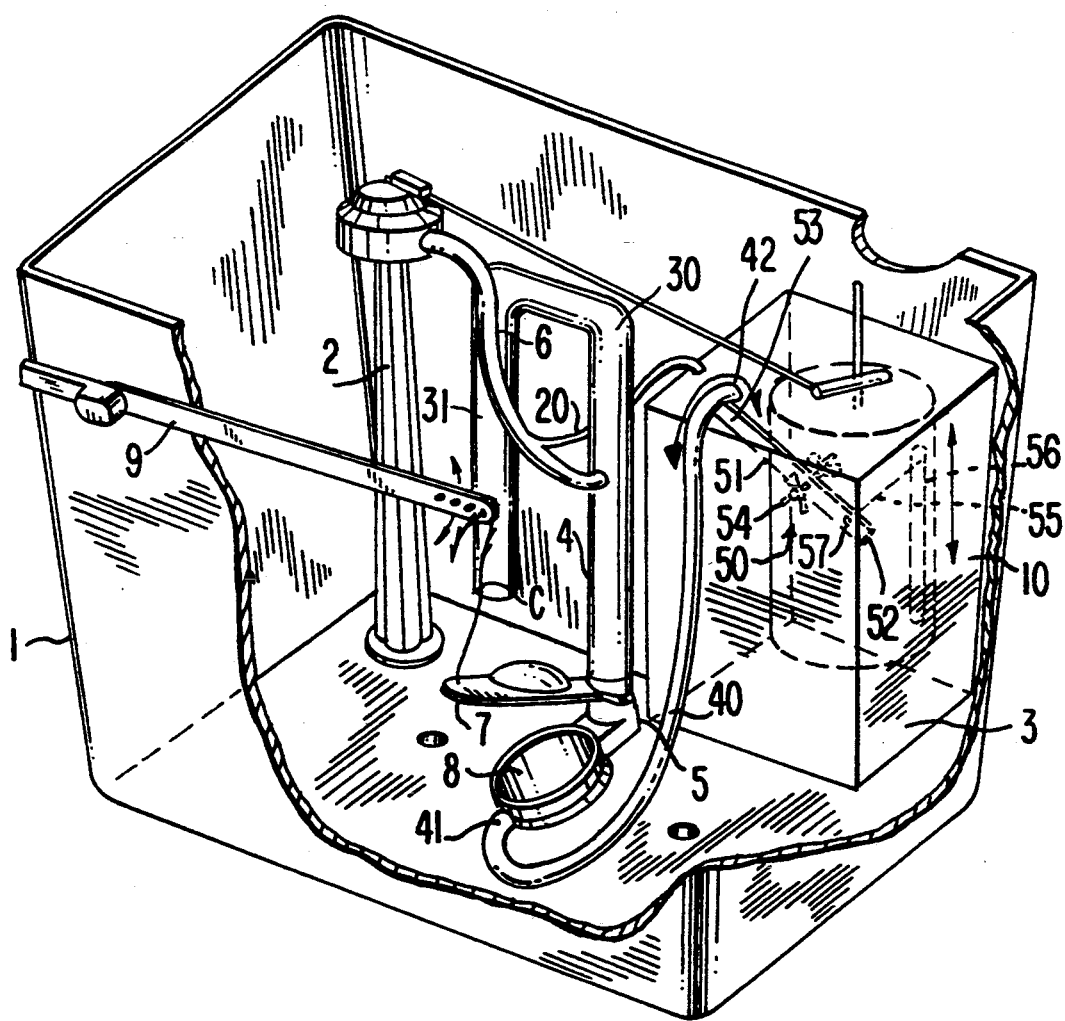
FIG. 2 is a cross section view of a toilet tank including the refilling preventing system of FIG. 1, in accordance with a second embodiment of the invention

Another embodiment for said plug 30, is illustrated in FIG. 2, wherein said plug includes an inverted "U" extension 31 for said flush tube 4, reaching near to the bottom of the tank 1 in which remains a minor level of water which seals the end of said extension 31 causing a vacuum therethrough.

During the normal use of the water closet, when the flush lever 9 is operated for a flushing effect, the stopper 7 will be lifted allowing the water contained in the toilet tank 1 to flush directly through the discharge opening 8 and, when the flush is finished, the stopper falls closing the discharge opening 8 causing a vacuum through said discharge opening 8, said overflow tube 4 closed by said plug 30 and said siphon conduit 40, pouring the water of said receptacle 10 by a siphon effect, to create the water seal at the bowl avoiding odors to escape therefrom and allowing the buoyant float to fall down opening the filling valve and allowing the water to fill again said toilet tank 1. While the filling valve 2 is filling toilet tank 1, it is filling also the receptacle 10 through the by-pass conduit 20 connected to the flexible conduit 6 to a top level, in order to close said filling valve 2 when the top level is reached.

In case of a leak through the stopper 7 or through any other part of the toilet tank 1, at a flow less than the filling flow, the filling valve will fill the toilet tank 1 as well as the receptacle 10 but, as the water of said toilet tank 1 is leaking, only the toilet tank 1 will be emptied and, as the buoyant float 3 is maintained floating in the top level of the receptacle 10 which remains full of water, the filling valve will be maintained closed avoiding refilling of said toilet tank 1 and consequently avoiding that the water continues to escape through said leak spending a lot of water.

In case that the leak be at a flow greater than the filling flow, the filling valve 2 will remain opened trying to fill the toilet tank 1 and also will be filling the receptacle 10 through the, bypass conduit 20, so that only an amount of water will be leaking while the receptacle 10 is being filled but, when it is filled, the buoyant float 3 will be at its top position closing the filling valve 2 interrupting the leak through the toilet tank 1.

Finally, it has to be understood that the invention is not limited to the above disclosed embodiment and that the persons skilled in the art could suggest changes in the type and design of components of the system of the present invention, derived from the teachings herein disclosed and which will be within the true spirit and scope of this invention as claimed in the following claims

What is claimed is:

1. A water closet comprising a toilet bowl and a toilet tank including a filling valve coupled to the toilet tank, operated by a buoyant float connected therewith, to open the filling valve after a flush discharge and close it when the tank is at a desired level of water; an overflow tube coupled to the tank, to discharge the water in case the tank is filled beyond the desired level; a conduit connected to the filling valve and to the overflow tube to fill the bowl at a desired level after a flush discharge; and a flush stopper coupled to a discharge opening at the bottom of the tank, operated by a flush lever connected thereto; a refilling preventing system for the toilet tank, to prevent refilling of the tank in case of a leak in the tank, comprising, in combination:

a receptacle in the tank, in which the buoyant float of the filling valve is placed, to fill the tank in accordance to the level of water in said receptacle;

water filling means to fill the receptacle after a flush discharge, while the filling valve is filling the tank;

plug means closing the overflow tube, to allow creation of a vacuum in said overflow tube and said discharge opening of the tank during a flush discharge;

siphon means connected to the discharge opening and to said receptacle; and a lever mechanism secured in the receptacle and connected to the buoyant float and to the siphon means, so that after a flush discharge when the stopper is closing the discharge opening of the tank, the effect of the vacuum caused by the plug means causes a siphon effect through said siphon means discharging the water of the receptacle allowing the buoyant float to fall down opening the filling valve and, when the buoyant float reaches a desired upper level, the lever mechanism lifts the siphon means interrupting the siphon effect allowing water to fill the tank through the filling valve and the receptacle through the water filling means, and finally, in case of a leak out of the toilet tank, as the buoyant float is maintained floating in the receptacle which remains full of water, the filling valve will be maintained closed avoiding refilling of said toilet tank and consequently avoiding that the water continues to escape through said leak.

2. The refilling preventing system as claimed in claim 1, wherein said water filling means to fill the receptacle after a flush discharge, while the filling valve is filling the tank, comprising a by-pass conduit connected to the flexible conduit and said receptacle in fluid communication.

3. The refilling preventing system as claimed in claim 1, wherein said siphon means comprising a conduit connected in fluid communication to the discharge opening and to the receptacle.

4. The refilling preventing system as claimed in claim 1, wherein said lever mechanism comprising a lever secured to a wall of the receptacle in an intermediate portion thereof by of a pivot member, a horizontal rod having a first end connected to the buoyant float and a second end connected to a first end of the lever, a second end of said lever being connected to a top end of the siphon conduit, so that when the buoyant float reaches the desired level, the lever lifts the siphon conduit interrupting the siphon effect allowing the water to fill the tank through the filling valve and the receptacle through the by pass-conduit which can be finally filled by overflow over the top wall of said receptacle.

5. The refilling preventing system as claimed in claim 1, wherein said plug means including a floating plug normally closing the overflow tube.

6. The refilling preventing system as claimed in claim 1, wherein said plug means including an inverted "U" extension for said flush tube, one of its ends reaching near to the bottom of the tank in which remains a minor level of water which seals the end of said extension allowing creation of the vacuum.

* * * * *